(12) United States Patent
Qi et al.

(10) Patent No.: US 11,828,300 B2
(45) Date of Patent: Nov. 28, 2023

(54) CORROSION-RESISTANT AIR PREHEATER CAPABLE OF SLOWING DOWN DUST DEPOSIT

(71) Applicant: Jining Huayuan Thermal Power Co., Ltd., Jining (CN)

(72) Inventors: Yunling Qi, Jining (CN); Hongliang Guo, Jining (CN); Xiugang Shi, Jining (CN); Zenggang Yue, Jining (CN); Qingguo Li, Jining (CN); Yeting Feng, Jining (CN); Yuansen Qi, Jining (CN)

(73) Assignees: JINING HUAYUAN THERMAL POWER CO., LTD., Jining (CN); HUANENG QUFU THERMAL POWER CO., LTD., Jining (CN)

( * ) Notice: Subject to any disclaimer, the term of this patent is extended or adjusted under 35 U.S.C. 154(b) by 0 days.

(21) Appl. No.: 17/932,698

(22) Filed: Sep. 16, 2022

(65) Prior Publication Data
US 2023/0092701 A1   Mar. 23, 2023

(30) Foreign Application Priority Data
Sep. 18, 2021  (CN) .......................... 202111098812.0

(51) Int. Cl.
*F04D 29/70* (2006.01)
*F04D 17/12* (2006.01)

(52) U.S. Cl.
CPC ........... *F04D 29/701* (2013.01); *F04D 17/12* (2013.01)

(58) Field of Classification Search
CPC .... F04D 29/701; F04D 17/12; F28D 21/0003; F28F 13/12; F28F 13/125
See application file for complete search history.

(56) References Cited

U.S. PATENT DOCUMENTS

| | | | | |
|---|---|---|---|---|
| 1,770,208 A | * | 7/1930 | Kemnal .................. | F28F 19/00 165/95 |
| 4,316,434 A | * | 2/1982 | Bailey ....................... | F28F 5/00 122/155.2 |
| 4,532,721 A | * | 8/1985 | Gordon .................. | F26B 23/002 34/514 |
| 4,559,998 A | * | 12/1985 | Counterman ........... | F28F 13/12 122/DIG. 13 |
| 4,655,802 A | * | 4/1987 | Jaumann ................. | F28F 21/04 423/242.1 |

(Continued)

*Primary Examiner* — Brian O Peters
(74) *Attorney, Agent, or Firm* — McDonnell Boehnen Hulbert & Berghoff

(57) ABSTRACT

Disclosed is a corrosion-resistant air preheater capable of slowing down dust deposit. The air preheater comprises a shell, an air inlet is fixedly formed in the side wall of the shell, an air outlet is fixedly formed in the side, away from the air inlet, of the shell, a flue gas through pipe is fixedly arranged on the inner side wall of the shell, rotating assemblies are arranged on the outer side wall of the flue gas through pipe, a flue gas inlet box is fixedly arranged at the top of the shell. According to the corrosion-resistant air preheater, an air pressure plate is pushed through the flue gas pressure intensity, and then the air pressure plate can descend. After the air pressure plate descends, rotating blades can rotate under the flowing effect of flue gas, then a movable rod rotates, and a scraping plate is further enabled to rotate.

5 Claims, 5 Drawing Sheets

(56) References Cited

U.S. PATENT DOCUMENTS

| | | | | |
|---|---|---|---|---|
| 5,221,439 A | * | 6/1993 | Li | B01D 1/222 |
| | | | | 202/175 |
| 8,653,042 B2 | * | 2/2014 | Dozzo | A61P 31/04 |
| | | | | 514/35 |

* cited by examiner

CORROSION-RESISTANT AIR PREHEATER CAPABLE OF SLOWING DOWN DUST DEPOSIT

CROSS-REFERENCE TO RELATED APPLICATION

This patent application claims the benefit and priority of Chinese Patent Application No. 202111098812.0, filed with the China National Intellectual Property Administration on Sep. 18, 2021, the disclosure of which is incorporated by reference herein in its entirety as part of the present application.

TECHNICAL FIELD

The present disclosure relates to the technical field of air preheaters, in particular to a corrosion-resistant air preheater capable of slowing down dust deposit.

BACKGROUND

Along with the ultra-low emission requirement, the denitration emission concentration is reduced in all factories, so that ammonia spraying is aggravated, ammonia escape is increased, and the amount of ammonium hydrogen sulfate is increased. The low-temperature section of the air preheater is in an ammonium hydrogen sulfate liquefaction state, and the ammonium hydrogen sulfate is deposited on the pipe wall of the air preheater and bonded with dust, so that the air preheater is blocked by dust deposit. Meanwhile, the temperature of exhausted smoke is low, sulfuric acid vapor is condensed to cause low-temperature corrosion, the hardness of ash particles is increased, and the abrasion loss is increased.

In the use process of a traditional tubular air preheater, dust in the traditional tubular air preheater is easily deposited, the interior of a flue gas pipeline is blocked, and then the interior of the pipeline is corroded, so that the service life of pipeline equipment is shortened, and the preheating efficiency is affected. Meanwhile, the flow of flue gas and air cannot be controlled. When the flow speed of the entering flue gas is too low, a large amount of dust is left in the flue gas pipeline and cannot flow out, so that the air preheater is severely blocked. The air preheater is burnt out when the air preheater is severely blocked. And then, a furnace is forced to shut down, so that the equipment is shut down. Therefore, a corrosion-resistant air preheater capable of slowing down dust deposit is provided to solve the problems.

SUMMARY

The present disclosure aims to solve the defects in the prior art, and provides a corrosion-resistant air preheater capable of slowing down dust deposit.

In order to achieve the above purpose, the present disclosure adopts the following technical scheme.

A corrosion-resistant air preheater capable of slowing down dust deposit, comprising a shell, wherein an air inlet is fixedly formed in the side wall of the shell, an air outlet is fixedly formed in the side, away from the air inlet, of the shell, a flue gas through pipe is fixedly arranged on the inner side wall of the shell, rotating assemblies are arranged on the outer side wall of the flue gas through pipe, a flue gas inlet box is fixedly arranged at the top of the shell, a flue gas inlet is fixedly formed in the top of the flue gas inlet box, a dust removal device is arranged on the inner side wall of the flue gas inlet, a dust discharge mechanism is arranged on the side wall of the flue gas inlet, a flue gas outlet box is fixedly arranged at the bottom of the shell, and a flue gas outlet is fixedly formed in the bottom of the flue gas outlet box.

Preferably, the rotating assemblies comprise connecting plates movably arranged on the outer side wall of the flue gas through pipe, a rotating plate is movably arranged at the end of the connecting plate, and a torsion spring is arranged at the joint of the rotating plate and the connecting plate.

Preferably, the dust removal device comprises a filter plate fixedly arranged on the inner side wall of the flue gas inlet, the central position of the filter plate is bulged, a limiting plate is fixedly arranged at the central position of the filter plate, a movable rod is movably arranged on the inner side wall of the limiting plate, a fixed block is fixedly arranged on the top of the movable rod, a scraping plate is fixedly arranged on the outer side wall of the fixed block, a return spring sleeves the outer side wall of the movable rod, the bottom of the movable rod penetrates through the limiting plate, and an air pressure assembly is arranged at the bottom of the movable rod.

Preferably, the dust discharge mechanism comprises a connecting ring fixedly arranged on the side wall of the flue gas inlet, a dust removal tank is formed in the inner side wall of the connecting ring, a cleaning block is movably arranged on the inner side wall of the dust removal tank, the size of the cleaning block is matched with that of the dust removal tank, the dust removal tank communicates with the flue gas inlet, the end of the cleaning block extends into the flue gas inlet, and a dust discharge pipe is fixedly arranged on the side wall of the dust removal tank.

Preferably, the inner side wall of the flue gas through pipe is made of enamel materials, the top of the flue gas through pipe extends into the flue gas inlet box, the flue gas through pipe communicates with the flue gas inlet box, the bottom of the flue gas through pipe extends into the flue gas outlet box, and the flue gas through pipe communicates with the flue gas outlet box.

Preferably, the air pressure assembly comprises an air pressure plate fixedly arranged at the bottom of the movable rod, the air pressure plate is used for opening and closing the flue gas inlet, the air pressure plate can slide on the side wall of the flue gas inlet, and rotating blades are fixedly arranged on the top of the air pressure plate.

Preferably, a cleaning brush is arranged at the bottom of the scraping plate, and abuts against the top of the filter plate.

Preferably, the top of the return spring abuts against the bottom of the fixed block, and the bottom of the return spring abuts against the top of the limiting plate.

Compared with the prior art, the present disclosure has the following beneficial effects.

Firstly, in the corrosion-resistant air preheater, the air pressure plate is pushed through the flue gas pressure intensity, and then the air pressure plate can descend. After the air pressure plate descends, the rotating blades can rotate under the flowing effect of flue gas, then the movable rod rotates, and the scraping plate is further enabled to rotate. When the scraping plate rotates, dust deposited on the top of the filter plate can be cleaned, so that the situation that a large amount of flue gas dust enters the interior of the filter plate to cause internal blockage is effectively avoided, the filter plate is prevented from being blocked, the cleanliness of the device is effectively improved, and the service life of the device is prolonged.

Secondly, in the corrosion-resistant air preheater, through the arrangement of the air pressure plate, when the flue gas discharge amount at the flue gas inlet does not reach a certain amount or a certain flow rate, the air pressure plate is in a closed state. Sufficient flue gas pushes away the air pressure plate through accumulation of the flue gas, the situations that the flue gas enters the flue gas through pipe, the flow rate is too low, and too much flue gas and dust are left can be effectively prevented, and dust residues in the device are reduced. The stability of the flue gas flow is further guaranteed, and the change of the flue gas flow speed and quantity is shortened, so that the operation of the device is more stable.

Thirdly, in the corrosion-resistant air preheater, when air flows into the flue gas through pipe through the air inlet, the entered air is blocked by the connecting plates on the outer side wall of the flue gas through pipe and the rotating plates, so that the contact time of the air and the flue gas through pipe is longer. When the air flow is increased, the rotating plate and the connecting plate are pushed to rotate, so that the contact area of the air and the flue gas through pipe is wider, and the air preheating efficiency is improved to a certain degree. The situations of preheating insufficiency and resource waste are avoided. Meanwhile, when the connecting plate and the rotating plate rotate, the rotating plates collide with each other, dust on the inner wall of the flue gas through pipe is shaken off, and the dust shaken off from the interior of the flue gas through pipe can rush out at the stable flow speed of the flue gas, so that the condition of dust blockage is further prevented, the blockage maintenance burden of the air preheater is reduced, and the working efficiency is improved.

Reference signs: 1, shell; 2, air inlet; 3, air outlet; 4, flue gas through pipe; 5, flue gas inlet; 6, flue gas outlet; 7, connecting ring; 8, flue gas inlet box; 9, filter plate; 10, limiting plate; 11, movable rod; 12, fixed block; 13, scraping plate; 14, return spring; 15, air pressure plate; 16, rotating blade; 17, dust discharge pipe; 18, dust removal tank; 19, cleaning block; 20, connecting plate; 21, rotating plate; and 22, flue gas outlet box.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure.

Figure 1:
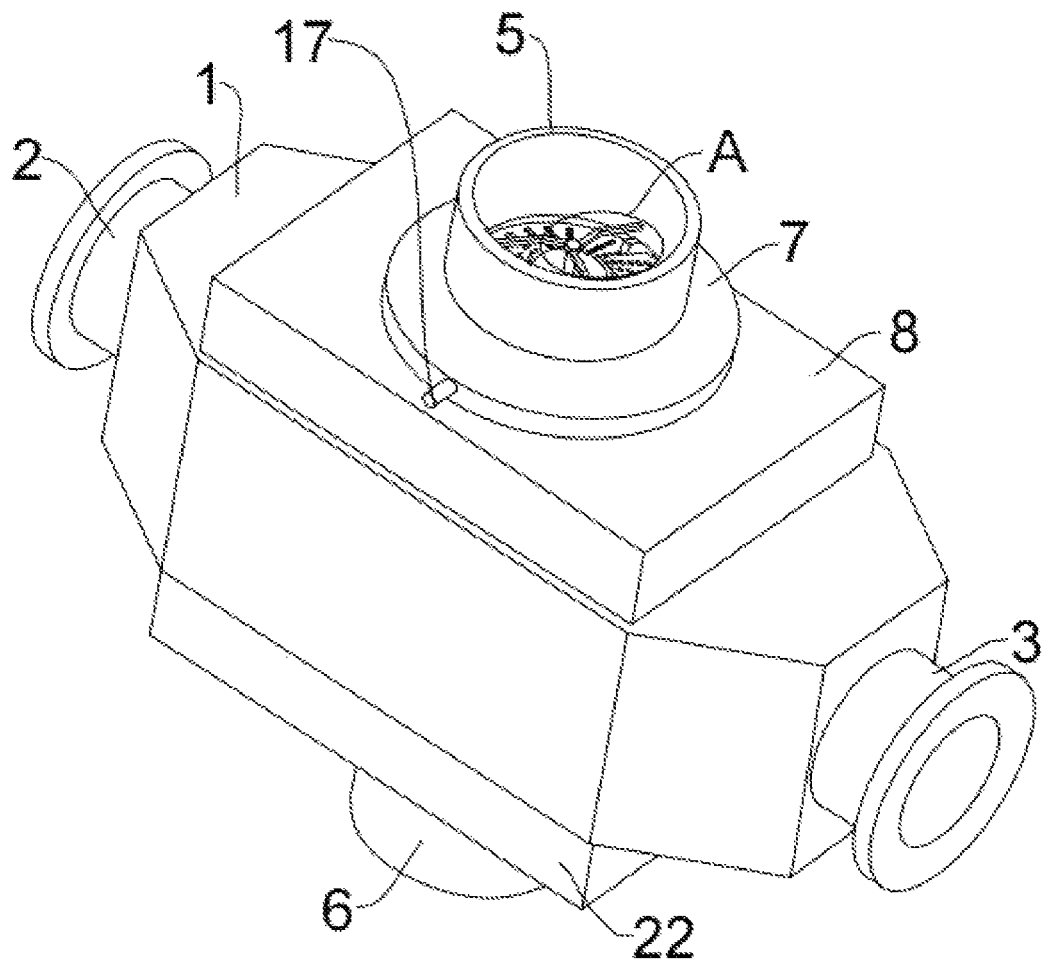
FIG. 1 is a structural schematic diagram of a corrosion-resistant air preheater capable of slowing down dust deposit provided by the present disclosure.
Figure 2:
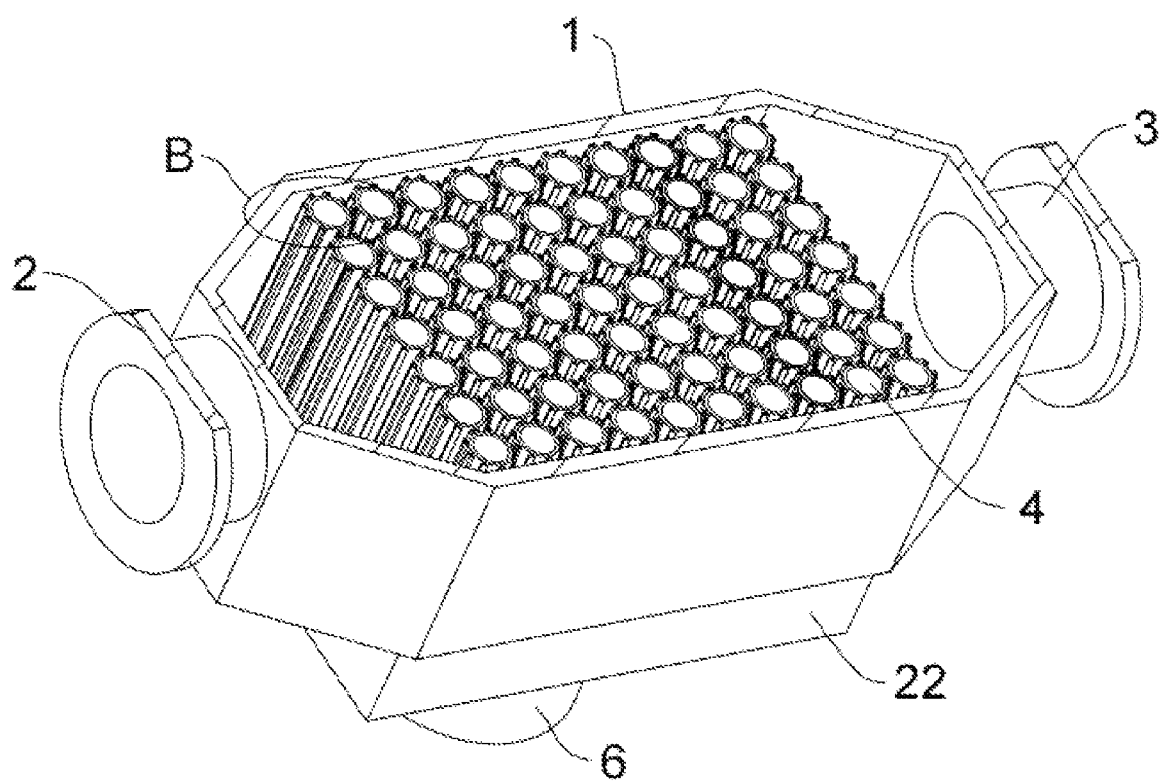
FIG. 2 is a structural section view of a corrosion-resistant air preheater capable of slowing down dust deposit provided by the present disclosure.
Figure 3:
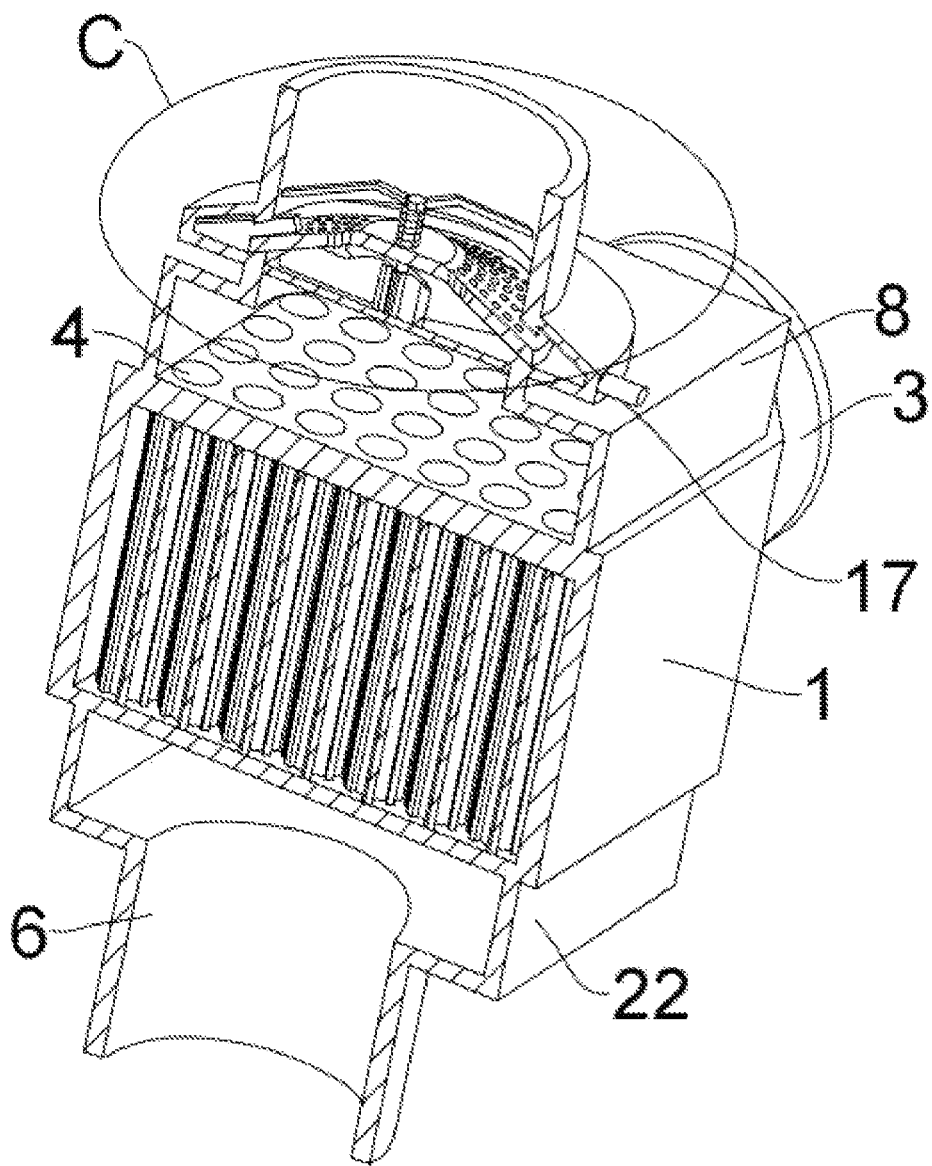
FIG. 3 is a structural side view of a corrosion-resistant air preheater capable of slowing down dust deposit provided by the present disclosure.
Figure 4:
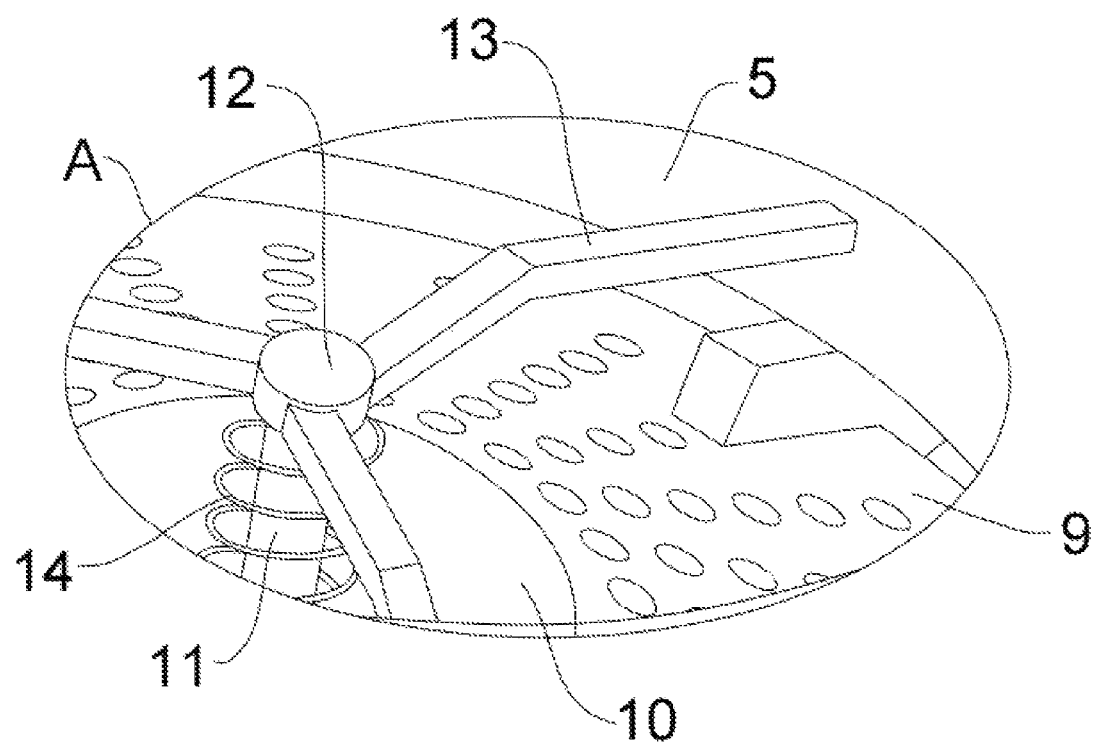
FIG. 4 is a structural enlarged view of a corrosion-resistant air preheater A capable of slowing down dust deposit provided by the present disclosure.
Figure 5:
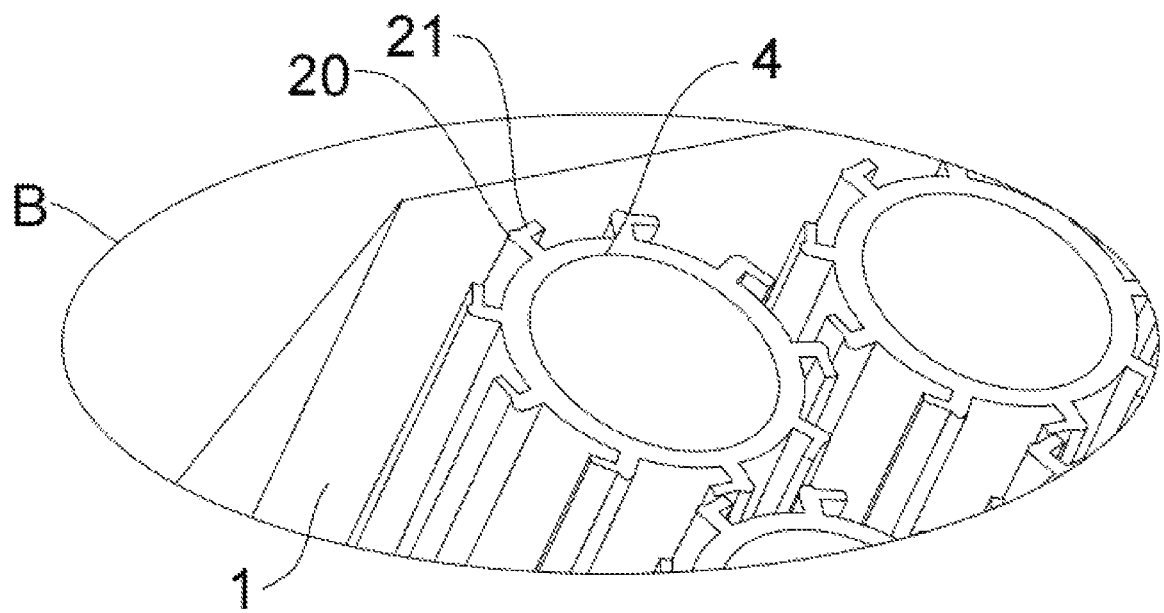
FIG. 5 is a structural enlarged view of a corrosion-resistant air preheater B capable of slowing down dust deposit provided by the present disclosure.
Figure 6:
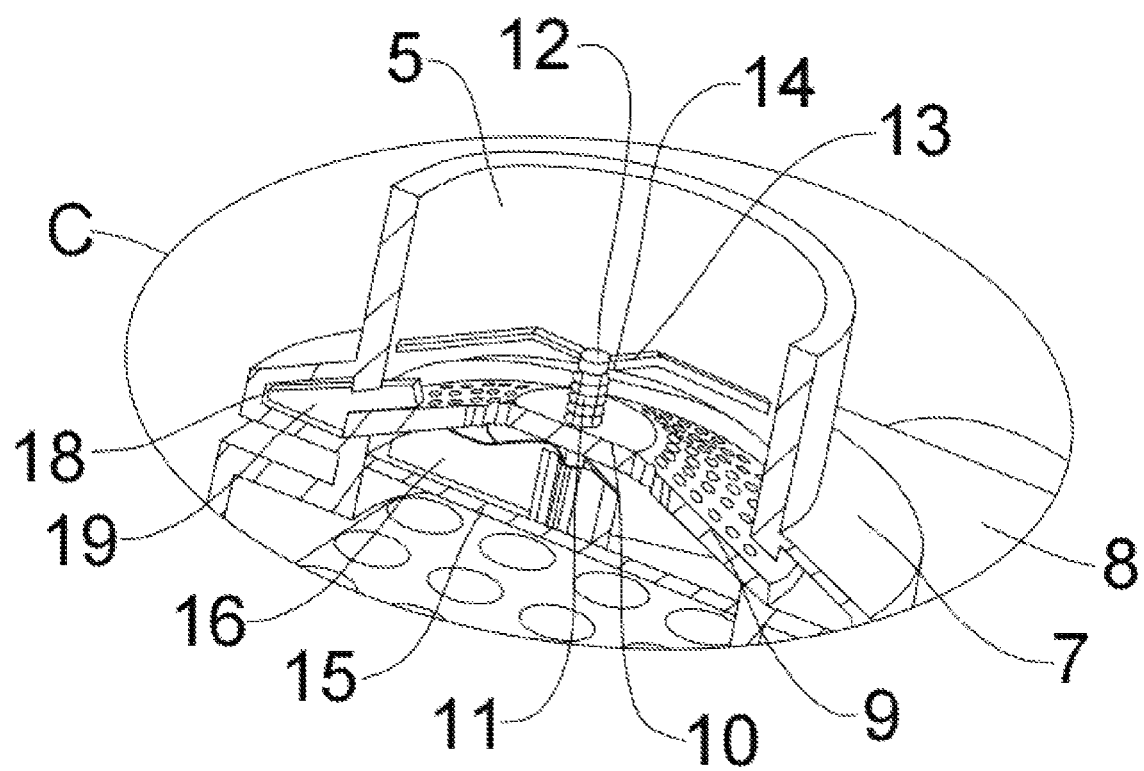
FIG. 6 is a structural enlarged view of a corrosion-resistant air preheater C capable of slowing down dust deposit provided by the present disclosure.

Referring to FIG. 1 to FIG. 6, a corrosion-resistant air preheater capable of slowing down dust deposit, comprising a shell 1, wherein an air inlet 2 is fixedly formed in the side wall of the shell 1, and an air outlet 3 is fixedly formed in the side, away from the air inlet 2, of the shell 1. A flue gas outlet box 22 is fixedly arranged at the bottom of the shell 1, a flue gas outlet 6 is fixedly formed in the bottom of the flue gas outlet box 22, and a flue gas through pipe 4 is fixedly arranged on the inner side wall of the shell 1. The inner side wall of the flue gas through pipe 4 is made of enamel materials, the top of the flue gas through pipe 4 extends into the flue gas inlet box 8, the flue gas through pipe 4 communicates with the flue gas inlet box 8, the bottom of the flue gas through pipe 4 extends into the flue gas outlet box 22, and the flue gas through pipe 4 communicates with the flue gas outlet box 22. Rotating assemblies are arranged on the outer side wall of the flue gas through pipe 4. The rotating assemblies comprise connecting plates 20 movably arranged on the outer side wall of the flue gas through pipe 4, a rotating plate 21 is movably arranged at the end of the connecting plate 20, and a torsion spring is arranged at the joint of the rotating plate 21 and the connecting plate 20.

When air flows into the flue gas through pipe through the air inlet 2, the entered air is blocked by the connecting plate 20 and the rotating plate 21 on the outer side wall of the flue gas through pipe 4, so that the contact time of the air and the flue gas through pipe 4 is longer. When the air flow is increased, the rotating plate 21 and the connecting plate 20 are pushed to rotate, so that the contact area of the air and the flue gas through pipe 4 is wider, and the air preheating efficiency is improved to a certain degree. The situations of preheating insufficiency and resource waste are avoided. Meanwhile, when the connecting plate 20 and the rotating plate 21 rotate, the rotating plates collide with each other, dust on the inner wall of the flue gas through pipe 4 is shaken off, and the dust shaken off from the interior of the flue gas through pipe 4 can rush out at the stable flow speed of the flue gas, so that the condition of dust blockage is further prevented, the blockage maintenance burden of the air preheater is reduced, and the working efficiency is improved.

A flue gas inlet box 8 is fixedly arranged at the top of the shell 1, a flue gas inlet 5 is fixedly formed in the top of the flue gas inlet box 8, and a dust removal device is arranged on the inner side wall of the flue gas inlet 5. The dust removal device comprises a filter plate 9 fixedly arranged on the inner side wall of the flue gas inlet 5, the central position of the filter plate 9 is bulged, a limiting plate 10 is fixedly arranged at the central position of the filter plate 9, and a movable rod 11 is movably arranged on the inner side wall of the limiting plate 10. The bottom of the movable rod 11 penetrates through the limiting plate 10, and an air pressure assembly is arranged at the bottom of the movable rod 11. The air pressure assembly comprises an air pressure plate 15 fixedly arranged at the bottom of the movable rod 11, the air pressure plate 15 is used for opening and closing the flue gas inlet 5, the air pressure plate 15 can slide on the side wall of the flue gas inlet 5, and rotating blades 16 are fixedly arranged on the top of the air pressure plate 15.

Through the arrangement of the air pressure plate 15, when the flue gas discharge amount at the flue gas inlet 5 does not reach a certain amount or a certain flow rate, the air pressure plate is in a closed state. Sufficient flue gas pushes away the air pressure plate 15 through accumulation of the flue gas, the situations that the flue gas enters the flue gas through pipe 4, the flow rate is too low, and too much flue gas and dust are left can be effectively prevented, and dust residues in the device are reduced. The stability of the flue gas flow is further guaranteed, and the change of the flue gas flow speed and quantity is shortened, so that the operation of the device is more stable.

A fixed block 12 is fixedly arranged on the top of the movable rod 11, and a scraping plate 13 is fixedly arranged on the outer side wall of the fixed block 12. A cleaning brush is arranged at the bottom of the scraping plate 13, and abuts against the top of the filter plate 9. A return spring 14 sleeves the outer side wall of the movable rod 11. The top of the return spring 14 abuts against the bottom of the fixed block 12, and the bottom of the return spring 14 abuts against the top of the limiting plate 10.

The air pressure plate 15 is pushed through the flue gas pressure intensity, and then the air pressure plate 15 can descend. After the air pressure plate 15 descends, the rotating blades 16 can rotate under the flowing effect of flue gas, then the movable rod 11 rotates, and the scraping plate 13 is further enabled to rotate. When the scraping plate 15 rotates, dust deposited on the top of the filter plate 9 can be cleaned, so that the situation that a large amount of flue gas dust enters the interior of the filter plate to cause internal blockage is effectively avoided, the filter plate 9 is prevented from being blocked, the cleanliness of the device is effectively improved, and the service life of the device is prolonged.

A dust discharge mechanism is arranged on the side wall of the flue gas inlet 5. The dust discharge mechanism comprises a connecting ring 7 fixedly arranged on the side wall of the flue gas inlet, a dust removal tank 18 is formed in the inner side wall of the connecting ring 7, a cleaning block 19 is movably arranged on the inner side wall of the dust removal tank 18, the size of the cleaning block 19 is matched with that of the dust removal tank 18, the dust removal tank 18 communicates with the flue gas inlet 5, the end of the cleaning block 19 extends into the flue gas inlet 5, and a dust discharge pipe 17 is fixedly arranged on the side wall of the dust removal tank 18.

When the scraping plate 13 rotates, the end of the scraping plate 13 pushes the cleaning block 19 to rotate in the dust removal tank 18, the cleaning block 19 rotates to scrape dust falling into the dust removal tank 18 from the filter plate 9, and the dust falling into the dust removal tank 18 on the filter plate 9 is discharged through the dust discharge pipe 17, so that the cleanliness of the device is further improved.

In the corrosion-resistant air preheater, when the corrosion-resistant air preheater is used, flue gas enters from the flue gas inlet 5. When the flue gas pressure intensity on the top reaches a certain degree, the air pressure plate 15 is pushed downwards, the air pressure plate 15 moves downwards, the movable rod 11 is driven to move downwards in the process that the air pressure plate 15 moves downwards, and then the fixed block 12 extrudes the return spring 14 downwards. The cleaning brush at the bottom of the scraping plate13 abuts against the top of the filter plate 9, the flue gas enters the flue gas inlet box 8 through the flue gas inlet 5 and then enters the flue gas through pipe 4, and the flue gas through pipe 4 is heated. Under the action of the flowing flue gas, the rotating blades 16 on the top of the air pressure plate 15 rotate. When the rotating blades 16 rotate, the movable rod 11 rotates, and then the scraping plate 13 rotates. The dust filtered from the filter plate 9 is cleaned through the scraping plate 13, and the dust falls into the dust removal tank 18 through the inclined arrangement of the filter plate 9.

When the scraping plate 13 rotates, the end of the scraping plate 13 pushes the cleaning block 19 to rotate in the dust removal tank 18, the cleaning block 19 rotates to scrape dust falling into the dust removal tank 18 from the filter plate 9, and the dust falling into the dust removal tank 18 on the filter plate 9 is discharged through the dust discharge pipe 17.

When air flows into the flue gas through pipe through the air inlet 2, the entered air is blocked by the connecting plates 20 on the outer side wall of the flue gas through pipe 4 and the rotating plates 21, so that the contact time of the air and the flue gas through pipe is longer. When the air flow is increased, the rotating plate 21 and the connecting plate 20 are pushed to rotate, so that the contact area of the air and the flue gas through pipe 4 is wider. Meanwhile, when the connecting plate 20 and the rotating plate 21 rotate, the rotating plates 21 collide with each other, so that dust on the inner wall of the flue gas through pipe 4 is shaken off.

In the description of the present disclosure, it needs to be illustrated that the indicative direction or position relations of the terms such as "center", "longitudinal", "transverse", "length", "width", "thickness", "upper", "lower", "front", "rear", "left", "right", "vertical", "horizontal", "top", "bottom", "inside", "outside", "clockwise" and "anti-clockwise" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

In addition, the terms "first" and "second" are merely intended for a purpose of description, and shall not be understood as an indication or implication of relative importance or implicit indication of the number of indicated technical features. Therefore, a feature limited by "first" or "second" may include one or more features explicitly or implicitly. In the description of the present disclosure, the meaning of "a plurality of" means two or more unless expressly specifically defined otherwise.

The above mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas thereof all shall be included in the scope of protection of the present disclosure.

What is claimed is:

1. A corrosion-resistant air preheater capable of slowing down dust deposit, comprising a shell, wherein an air inlet is fixedly formed in the side wall of the shell, an air outlet is fixedly formed in the side, away from the air inlet, of the shell, a flue gas through pipe is fixedly arranged on the inner side wall of the shell, rotating assemblies are arranged on the outer side wall of the flue gas through pipe, a flue gas inlet box (8) is fixedly arranged at the top of the shell, a flue gas inlet (5) is fixedly formed in the top of the flue gas inlet box, a dust removal device is arranged on the inner side wall of the flue gas inlet, a dust discharge mechanism is arranged on the side wall of the flue gas inlet, a flue gas outlet box is fixedly arranged at the bottom of the shell, and a flue gas outlet is fixedly formed in the bottom of the flue gas outlet box;

wherein the rotating assemblies comprise connecting plates movably arranged on the outer side wall of the flue gas through pipe, a rotating plate is movably arranged at the end of the connecting plate, and a torsion spring is arranged at the joint of the rotating plate and the connecting plate;

wherein the dust removal device comprises a filter plate fixedly arranged on the inner side wall of the flue gas inlet, the central position of the filter plate is bulged, a limiting plate is fixedly arranged at the central position of the filter plate, a movable rod is movably arranged on the inner side wall of the limiting plate, a fixed block is fixedly arranged on the top of the movable rod, a scraping plate is fixedly arranged on the outer side wall of the fixed block, a return spring sleeves the outer side wall of the movable rod, the bottom of the movable rod penetrates through the limiting plate, and an air pressure assembly is arranged at the bottom of the movable rod;

wherein the dust discharge mechanism comprises a connecting ring fixedly arranged on the side wall of the flue gas inlet, a dust removal tank is formed in the inner side wall of the connecting ring, a cleaning block is movably arranged on the inner side wall of the dust removal tank, the size of the cleaning block is matched with that of the dust removal tank, the dust removal tank communicates with the flue gas inlet, the end of the cleaning block extends into the flue gas inlet, and a dust discharge pipe is fixedly arranged on the side wall of the dust removal tank.

2. The corrosion-resistant air preheater capable of slowing down dust deposit according to claim 1, wherein the inner side wall of the flue gas through pipe is made of enamel materials, the top of the flue gas through pipe extends into the flue gas inlet box, the flue gas through pipe communicates with the flue gas inlet box, the bottom of the flue gas through pipe extends into the flue gas outlet box, and the flue gas through pipe communicates with the flue gas outlet box.

3. The corrosion-resistant air preheater capable of slowing down dust deposit according to claim 1, wherein the air pressure assembly comprises an air pressure plate fixedly arranged at the bottom of the movable rod, the air pressure plate is used for opening and closing the flue gas inlet, the air pressure plate can slide on the side wall of the flue gas inlet, and rotating blades are fixedly arranged on the top of the air pressure plate.

4. The corrosion-resistant air preheater capable of slowing down dust deposit according to claim 1, wherein a cleaning brush is arranged at the bottom of the scraping plate, and abuts against the top of the filter plate.

5. The corrosion-resistant air preheater capable of slowing down dust deposit according to claim 1, wherein the top of the return spring abuts against the bottom of the fixed block, and the bottom of the return spring abuts against the top of the limiting plate.

* * * * *